United States Patent
Kim et al.

(10) Patent No.: US 11,990,642 B2
(45) Date of Patent: May 21, 2024

(54) SEPARATOR FOR ELECTROCHEMICAL DEVICE AND METHOD FOR MANUFACTURING THE SAME

(71) Applicant: LG CHEM, LTD., Seoul (KR)

(72) Inventors: Young-Bok Kim, Daejeon (KR); Dong-Wook Sung, Daejeon (KR); So-Mi Jeong, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 746 days.

(21) Appl. No.: 17/255,825

(22) PCT Filed: Sep. 27, 2019

(86) PCT No.: PCT/KR2019/012607
§ 371 (c)(1),
(2) Date: Dec. 23, 2020

(87) PCT Pub. No.: WO2020/067778
PCT Pub. Date: Apr. 2, 2020

(65) Prior Publication Data
US 2021/0280945 A1    Sep. 9, 2021

(30) Foreign Application Priority Data
Sep. 28, 2018 (KR) .................. 10-2018-0116542

(51) Int. Cl.
*H01M 50/449* (2021.01)
*H01G 11/52* (2013.01)
(Continued)

(52) U.S. Cl.
CPC .......... *H01M 50/449* (2021.01); *H01G 11/52* (2013.01); *H01M 50/403* (2021.01);
(Continued)

(58) Field of Classification Search
None
See application file for complete search history.

(56) References Cited

U.S. PATENT DOCUMENTS

| | | |
|---|---|---|
| 2007/0009803 A1 | 1/2007 | Kim et al. |
| 2014/0038025 A1 | 2/2014 | Ha et al. |
| | (Continued) | |

FOREIGN PATENT DOCUMENTS

| | | |
|---|---|---|
| CN | 106207059 A | 12/2016 |
| JP | 2002-15757 A | 1/2002 |
| | (Continued) | |

OTHER PUBLICATIONS

English translation of CN106207059 (Year: 2016).*
(Continued)

*Primary Examiner* — Lucas J. O'Donnell
(74) *Attorney, Agent, or Firm* — Birch, Stewart, Kolasch & Birch, LLP

(57) ABSTRACT

A separator including a porous polymer substrate and an inorganic coating layer formed on at least one surface of the porous polymer substrate. The inorganic coating layer includes inorganic particles and a binder resin. The binder resin includes a first binder resin and a second binder resin. The first binder resin comprises a polyvinylidene fluoride (PVdF)-based polymer and the second binder resin comprises an acrylic polymer. The acrylic polymer has an acid value of 1 or less and a glass transition temperature, $T_g$, of 90° C. to 130° C. In addition, the inorganic coating layer has a high content of binder resin at the top layer portion to provide excellent adhesion between the separator and an electrode.

16 Claims, 4 Drawing Sheets

(51) Int. Cl.
    *H01M 50/403*     (2021.01)
    *H01M 50/42*     (2021.01)
    *H01M 50/426*     (2021.01)
    *H01M 50/443*     (2021.01)
    *H01M 50/446*     (2021.01)
    *H01M 50/46*     (2021.01)
    *H01M 50/489*     (2021.01)

(52) U.S. Cl.
    CPC ......... *H01M 50/42* (2021.01); *H01M 50/426* (2021.01); *H01M 50/443* (2021.01); *H01M 50/446* (2021.01); *H01M 50/461* (2021.01); *H01M 50/489* (2021.01)

(56) References Cited

U.S. PATENT DOCUMENTS

| | | | |
|---|---|---|---|
| 2016/0149190 | A1 | 5/2016 | Fukuchi |
| 2016/0293999 | A1 | 10/2016 | Kim et al. |
| 2017/0338459 | A1 | 11/2017 | Nakahiro et al. |
| 2018/0034025 | A1* | 2/2018 | Lee ................ H01M 50/457 |
| 2018/0123106 | A1 | 5/2018 | Shin et al. |
| 2018/0233727 | A1 | 8/2018 | Sakurai et al. |
| 2019/0131604 | A1 | 5/2019 | Yoon et al. |
| 2019/0245183 | A1 | 8/2019 | Jeong et al. |

FOREIGN PATENT DOCUMENTS

| | | |
|---|---|---|
| JP | 2014-171974 A | 9/2014 |
| JP | 2016-72150 A | 5/2016 |
| JP | 2017-026485 A | 2/2017 |
| JP | 2017-152268 A | 8/2017 |
| JP | 2018-055882 A | 4/2018 |
| JP | 2018-115348 A | 7/2018 |
| JP | 2018-133246 A | 8/2018 |
| KR | 10-2003-0027969 A | 4/2003 |
| KR | 10-2007-0034038 A | 3/2007 |
| KR | 10-2014-0017762 A | 2/2014 |
| KR | 10-2015-0106809 A | 9/2015 |
| KR | 10-2016-0061260 A | 5/2016 |
| KR | 10-2016-0117109 A | 10/2016 |
| KR | 10-2016-0129762 A | 11/2016 |
| KR | 10-2017-0024574 A | 3/2017 |
| KR | 10-2018-0018408 A | 2/2018 |
| WO | WO 2016/098684 A1 | 6/2016 |
| WO | WO 2018/055882 A1 | 3/2018 |
| WO | WO 2018/147714 A1 | 8/2018 |

OTHER PUBLICATIONS

English translation of KR20150106809 (Year: 2015).*
English translation of KR20160129762 (Year: 2016).*
Extended European Search Report for Application No. 19868070.4, dated Oct. 7, 2021.
Joon-Yong Sohn et al., "PVDF-HFP/PMMA-coated PE separator for lithium ion battery", Journal of Solid State Electrochemistry, vol. 16, No. 2, 2011, pp. 551-556.
Mettler-Toledo AG, "Thermal Analysis of Polymers", Application handbook—Selected Applications—Thermal Analysis, 2013, pp. 1-40.
Thomas Dent, "GPC-SEC Practical Tips and Tricks", Agilent Technologies, 2011, pp. 1-37.
International Search Report for PCT/KR2019/012607 dated Jan. 21, 2020.

* cited by examiner

| Ingredients | | | Ex. 1 | Ex. 2 | Ex. 3a | Ex. 3b | Ex. 3c | Ex. 3d |
|---|---|---|---|---|---|---|---|---|
| Binder resin | PVDF-HFP | Molecular weight(Mw) | 400,000 | 400,000 | 400,000 | 400,000 | 400,000 | 400,000 |
| | | HFP content | 10 mol% | 10 mol% | 10 mol% | 10 mol% | 10 mol% | 10 mol% |
| | PMMA | Molecular weight(Mw) | 130,000 | 130,000 | 130,000 | 130,000 | 130,000 | 130,000 |
| | | Acid value | < 1.0 | < 1.0 | < 1.0 | < 1.0 | < 1.0 | < 1.0 |
| | | Tg (°C) | 110 | 110 | 110 | 110 | 110 | 110 |
| PVDF-HFP:PMMA (Weight ratio) | | | 15:5 | 15:5 | 16:4 | 12:8 | 10:10 | 4:16 |
| Binder resin : Dispersing agent : Inorganic particles (Weight ratio) | | | 20:2:78 | 20:2:78 | 20:2:78 | 20:2:78 | 20:2:78 | 20:2:78 |

SEPARATOR FOR ELECTROCHEMICAL DEVICE AND METHOD FOR MANUFACTURING THE SAME

TECHNICAL FIELD

The present application claims priority to Korean Patent Application No. 10-2018-0116542 filed on Sep. 28, 2018 in the Republic of Korea. The present disclosure relates to a separator for an electrochemical device, wherein the electrochemical device may be a primary battery or secondary battery and the secondary battery includes a lithium ion secondary battery.

BACKGROUND ART

Non-aqueous secondary batteries represented by lithium ion secondary batteries have been used widely as electric power sources for portable electronic instruments, such as notebook PCs, cellular phones, digital cameras, camcorders, or the like. In addition, recently, such batteries have been examined about their application to vehicles by virtue of their characteristic high energy density.

As portable electronic instruments have been downsized and weight-lightened, outer casings for non-aqueous secondary batteries have been simplified. At the initial stage, battery cans made of stainless steel were used as outer casings. However, since outer casings made of aluminum were developed, soft pack outer casings made of aluminum laminate packs have been developed recently. In the case of soft pack outer casings made of aluminum laminate packs, they are flexible, and thus may form a gap between an electrode and a separator during charge/discharge to cause a technical problem of degradation of cycle life. To solve the above-mentioned problem, technology of adhesion between an electrode and a separator is important, and many suggestions have been made about the technology.

In addition, when a curved battery is manufactured, an electrode assembly including a separator bound to electrodes is subjected to deformation, such as bending. When the binding force between an electrode and a separator is low, they may be separated from each other upon such deformation. As a result, no electrochemical reaction may occur between the electrode and separator, or a dead space having low efficiency may be generated, resulting in a problem of degradation of battery quality.

In general, polyvinylidene fluoride (PVdF)-based resin is used as a binder resin for an electrode adhesive layer. In addition, the binder resin is allowed to migrate toward the surface of the separator through a humidified phase separation process so that an adhesive top layer portion having a high content of binder resin may be formed near the surface of an inorganic coating layer. However, PVdF-based resin itself does not have high adhesion, and thus hardly ensures a high level of binding force. To improve the adhesion, the content or coating amount of binder resin may be increased. However, in this case, the resultant adhesive layer has an increased thickness to cause a decrease in energy density and an increase in resistance undesirably. It is required for the adhesive layer of a separator to accomplish high adhesion and high ion conductivity, even when it has a small thickness. In addition, a separator should be a chemically and electrochemically stable material in order to use a battery stably for a long time. Further, a process for manufacturing a separator should provide high productivity to allow mass production at low cost. Under these circumstances, there is a need for developing a separator for a secondary battery satisfying the above-mentioned requirements.

DISCLOSURE

Technical Problem

The present disclosure is directed to providing a separator which has a small thickness and includes an inorganic coating layer having improved adhesion to an electrode. The present disclosure is also directed to providing a method for manufacturing a separator having the above-mentioned characteristics. It will be easily understood that the objects and advantages of the present disclosure may be realized by the means shown in the appended claims and combinations thereof.

Technical Solution

In one aspect, the present disclosure provides a novel separator for an electrochemical device to solve the above-mentioned technical problems. According to the first embodiment of the present disclosure, there is provided a separator which includes a porous polymer substrate and an inorganic coating layer formed on at least one surface of the porous polymer substrate, wherein the inorganic coating layer includes inorganic particles and a binder resin, wherein the binder resin includes a first binder resin and a second binder resin, wherein the first binder resin comprises a polyvinylidene fluoride (PVdF)-based polymer and the second binder resin comprises an acrylic polymer, and the acrylic polymer has an acid value of 1 or less and a glass transition temperature, $T_g$, of 90° C. to 130° C.

According to the second embodiment of the present disclosure, there is provided the separator as defined in the first embodiment, wherein the acrylic polymer has an acid value of 1 or less and a weight average molecular weight ($M_w$) of 100,000-200,000.

According to the third embodiment of the present disclosure, there is provided the separator as defined in the first or the second embodiment, wherein the acrylic polymer has an acid value of 1 or less, a weight average molecular weight ($M_w$) of 100,000-200,000, and a glass transition temperature ($T_g$) of 90° C.-130° C.

According to the fourth embodiment of the present disclosure, there is provided the separator as defined in any one of the first to the third embodiments, wherein the acrylic polymer includes a (meth)acrylate-containing (meth)acrylic polymer, wherein monomer of the (meth)acrylate polymer includes at least one selected from butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate and tetradecyl (meth)acrylate.

According to the fifth embodiment of the present disclosure, there is provided the separator as defined in any one of the first to the fourth embodiments, wherein the acrylic polymer includes poly(methyl methacrylate) (PMMA), and the PMMA has a molecular average molecular weight ($M_w$) of 100,000-200,000, an acid value of 1 or less, and $T_g$ of 90° C.-130° C.

According to the sixth embodiment of the present disclosure, there is provided the separator as defined in any one of the first to the fifth embodiments, wherein the acrylic polymer is present in an amount of 10 wt % to 80 wt % based on 100 wt % of the binder resin.

According to the seventh embodiment of the present disclosure, there is provided the separator as defined in any one of the first to the sixth embodiments, wherein the acrylic polymer is present in an amount of 10 wt % to 50 wt % based on 100 wt % of the binder resin.

According to the eighth embodiment of the present disclosure, there is provided the separator as defined in any one of the first to the seventh embodiments, wherein the PVdF-based polymer includes at least one of vinylidene fluoride homopolymer, copolymer of vinylidene fluoride with a copolymerizable monomer and a mixture thereof.

According to the ninth embodiment of the present disclosure, there is provided the separator as defined in any one of the first to the eighth embodiments, wherein the PVdF-based polymer has a molecular weight ($M_w$) of 300,000-1,000,000.

According to the tenth embodiment of the present disclosure, there is provided the separator as defined in any one of the first to the third embodiments, wherein the monomer copolymerizable with vinylidene fluoride is at least one selected from vinyl fluoride, trifluoroethylene (TrFE), chlorotrifluoroethylene (CTFE), 1,2-difluoroethylene, tetrafluoroethylene (TFE), hexafluoropropylene (HFP), perfluoro(alkylvinyl)ether, perfluoro(1,3-dioxole) and perfluoro(2,2-dimethyl-1,3-dioxole) (PDD).

According to the eleventh embodiment of the present disclosure, there is provided the separator as defined in any one of the first to the tenth embodiments, wherein a portion of the inorganic coating layer at a surface of the inorganic coating layer opposite to the porous polymer substrate forms an electrode adhesive portion, wherein the electrode adhesive portion has a content of binder resin that is higher than a content of binder resin in the remainder of the inorganic coating layer adjacent to the porous polymer substrate.

According to the twelfth embodiment of the present disclosure, there is provided the separator as defined in any one of the first to the eleventh embodiments, wherein the electrode adhesive portion is disposed on the surface of the inorganic coating layer of the separator through a phase separation process under a humidified condition.

According to the thirteenth embodiment of the present disclosure, there is provided the separator as defined in any one of the first to the twelfth embodiments, wherein the humidified condition includes a relative humidity of 40%-80%.

According to the fourteenth embodiment of the present disclosure, there is provided an electrode assembly for an electrochemical device including a positive electrode, a negative electrode and a separator interposed between the positive electrode and the negative electrode, wherein the separator is defined in any one of the first to the thirteenth embodiments.

According to the fifteenth embodiment of the present disclosure, there is provided a method for manufacturing the separator as defined in any one of the first to the thirteenth embodiments, the method including: preparing a porous polymer substrate; applying a slurry for an inorganic coating layer onto at least one surface of the porous polymer substrate; subjecting the slurry to phase separation under a humidified condition to form an electrode adhesive portion of the inorganic coating layer on the surface of the inorganic coating layer of the separator, wherein a content of binder resin is higher in the electrode adhesive portion than a content of binder resin in the remainder of the inorganic coating layer adjacent to the porous polymer substrate.

According to the sixteen the embodiment of the present disclosure, there is provided the method as defined in the fifteenth embodiment, wherein the humidified condition includes a relative humidity of 40%-80%.

Advantageous Effects

The separator and electrochemical device including the same according to the present disclosure show excellent adhesion between an electrode and the separator and allows diversification of the process for assembling an electrochemical device by using such excellent adhesion. In addition, the separator according to the present disclosure shows high peel strength between the inorganic coating layer and the separator substrate, and thus prevents the separator substrate from shrinking by virtue of the inorganic coating layer, thereby providing high heat resistance and stability of the separator. Further, it is possible to reduce the thickness of a separator according to the present disclosure. Therefore, it is possible to improve the energy density of a battery effectively.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
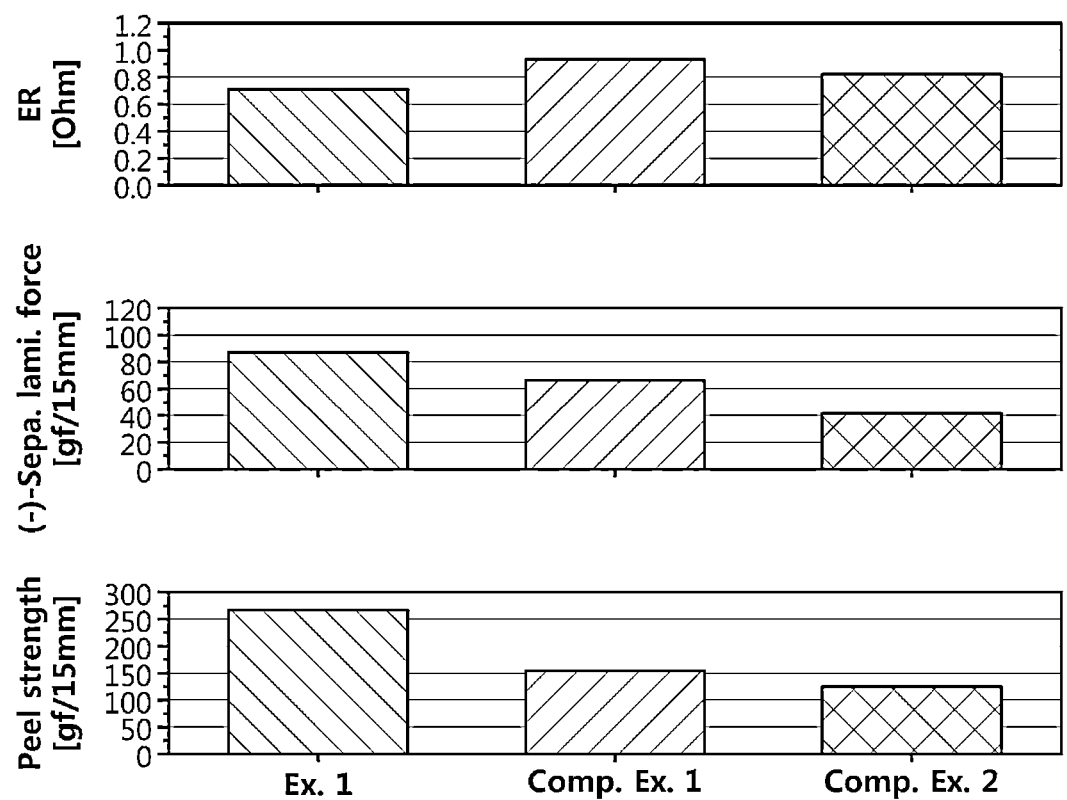
FIG. 1 shows diagrams illustrating the Gurley value, resistance, electrode adhesion and peel strength of each of the separators according to Example 1 and Comparative Examples 1 and 2.
Figure 2:
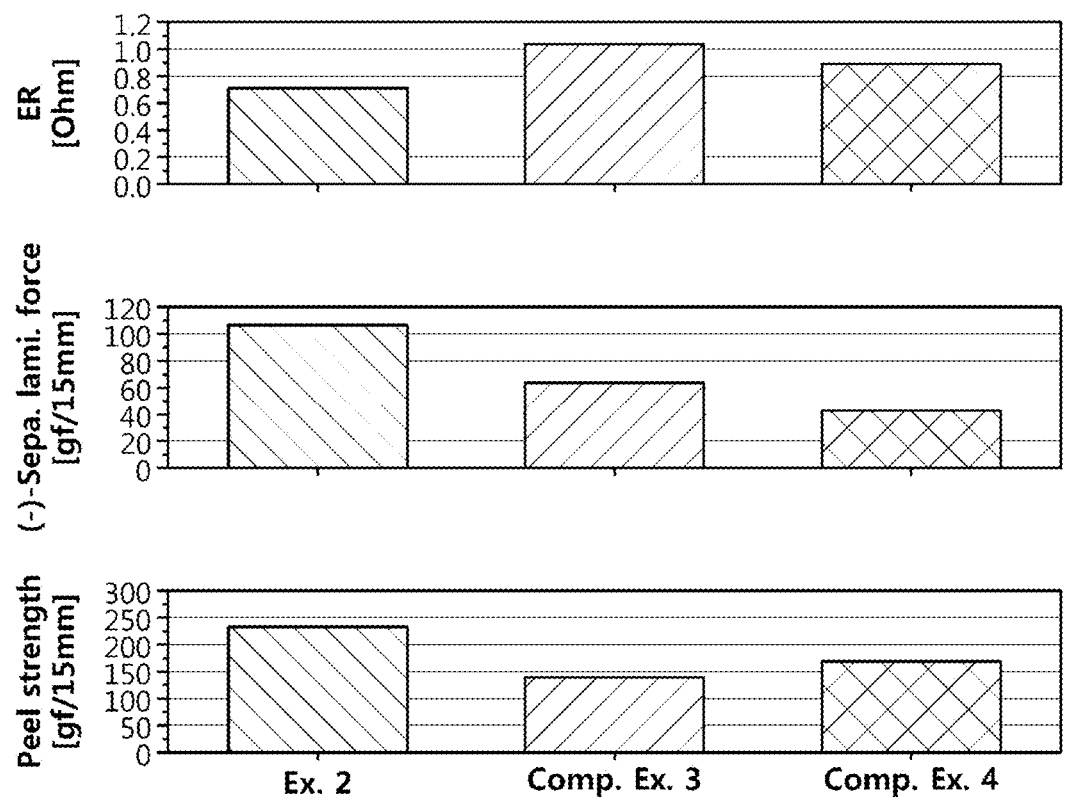
FIG. 2 shows diagrams illustrating the Gurley value, resistance, electrode adhesion and peel strength of each of the separators according to Example 2 and Comparative Examples 3 and 4.
Figure 3A:
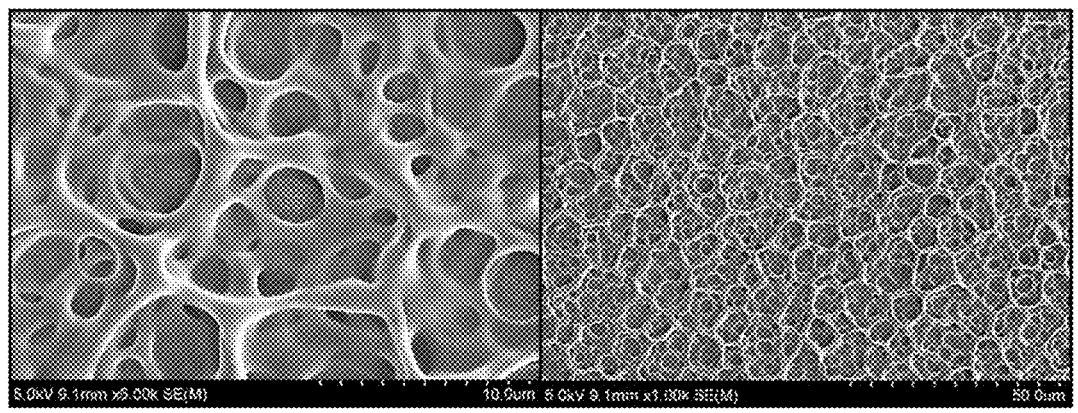
FIG. 3a to FIG. 3d show scanning electron microscopic (SEM) images illustrating the surface morphology of each of the separators according to Reference Examples 1a-1d.
Figure 3B:
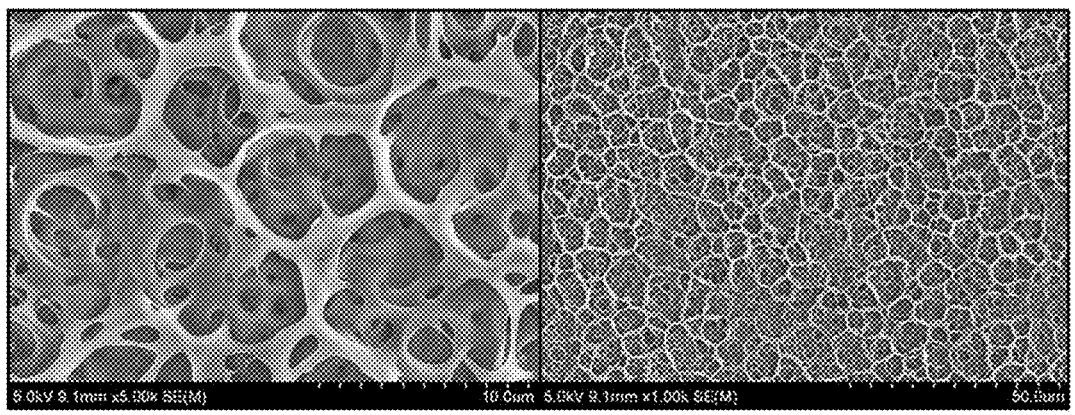
Figure 3C:
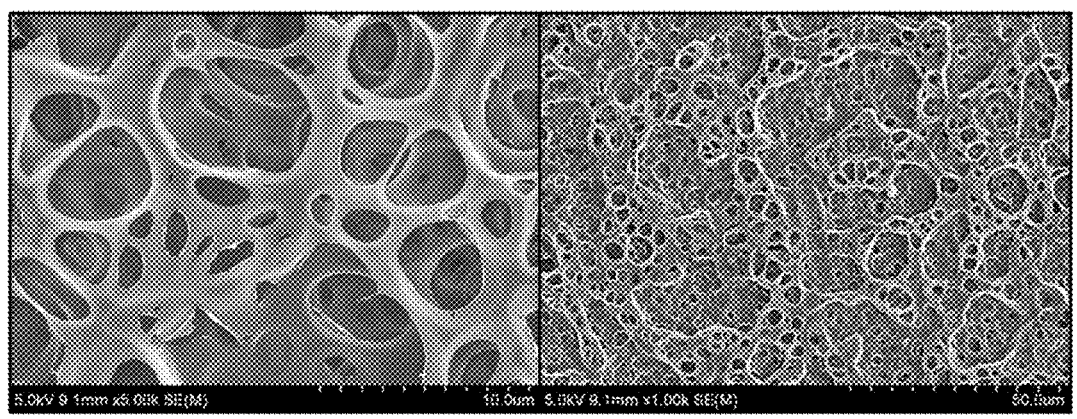
Figure 3D:
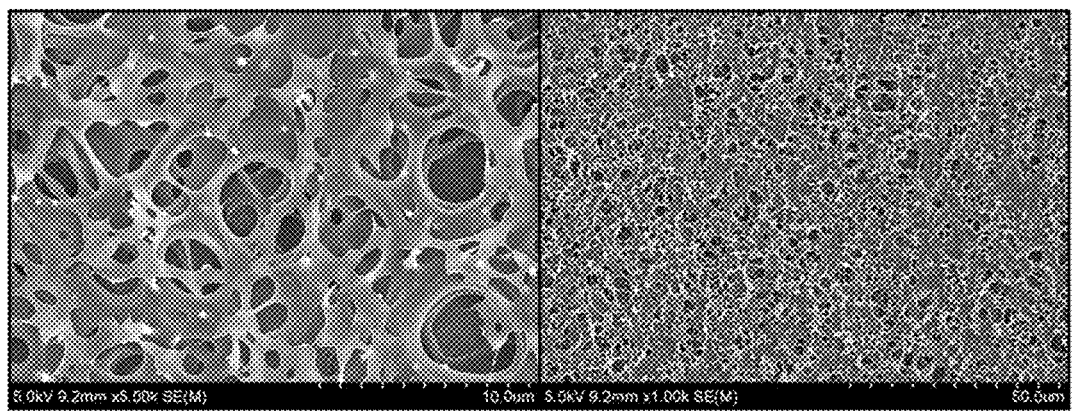

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

Unless otherwise stated, ratios for content stated herein refer to weight ratios.

The present disclosure relates to a separator for an electrochemical device and an electrochemical device including the same. As used herein, the term 'electrochemical device' means a device converting chemical energy into electrical energy by electrochemical reactions and has a concept covering a primary battery and a secondary battery, wherein the secondary battery is rechargeable and has a concept covering a lithium ion battery, nickel-cadmium battery, nickel metal hydride battery, or the like.

1. Separator

1) Structure of Separator

The separator according to the present disclosure includes a porous polymer substrate, and an inorganic coating layer formed on at least one surface of the porous polymer substrate. The inorganic coating layer includes inorganic particles and a binder resin, and the binder resin includes a first binder resin including a polyvinylidene fluoride (PVdF)-based polymer and a second binder resin including an acrylic polymer having an acid value of 1 or less. According to an embodiment of the present disclosure, the inorganic coating layer has a high content of binder resin at the top layer portion, and thus shows excellent adhesion between the separator and an electrode.

According to an embodiment of the present disclosure, the separator may have a thickness of 5 μm-30 μm and the thickness may be controlled suitably within the above-defined range. For example, the thickness may be 15 μm-25 μm. In addition, the separator may have a permeability of about 50 sec/100 cc to 3000 sec/100 cc.

As used herein, the term 'permeability' means a time required for 100 cc of air to pass through an object, such as a separator or porous polymer substrate, to be tested for permeability, is expressed in the unit of second/100 cc, may be used exchangeably with 'transmission', and is generally represented by Gurley value, or the like. According to an embodiment of the present disclosure, the permeability may be determined according to JIS P8117. In addition, air permeability P1 determined for an object having a thickness of T1 may be converted into air permeability P2 of the object having a thickness of 20 μm according to the mathematical formula of $P2=(P1\times20)/T1$.

Meanwhile, according to the present disclosure, the porosity and pore size may be determined by BELSORP (BET apparatus) available from BEL JAPAN Co. using an adsorption gas, such as nitrogen, or through a method, such as mercury intrusion porosimetry or capillary flow porosimetry. According to an embodiment of the present disclosure, the thickness and weight of the resultant coating layer may be measured to calculate porosity from the theoretical density of the coating layer.

2) Porous Polymer Substrate

The porous polymer substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the porous polymer substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous polymer substrate may include a non-woven web, a porous polymer film, or a laminate of two or more layers thereof, but is not limited thereto.

Particularly, the porous polymer substrate is any one of the following a) to e):
  a) A porous film formed by melting/extruding a polymer resin;
  b) A multilayer film formed by stacking two or more layers of the porous films of a);
  c) A non-woven web formed by integrating filaments obtained by melting/spinning a polymer resin;
  d) A multilayer film formed by stacking two or more layers of the non-woven webs of c); and
  e) A porous composite film having a multilayer structure including two or more of a) to d).

According to the present disclosure, the porous polymer substrate preferably has a thickness of 3 μm-12 μm, or 5 μm-12 μm. When the thickness is smaller than the above-defined range, it is not possible to obtain a sufficient conducting barrier function. On the other hand, when the thickness is excessively larger than the above-defined range (i.e. the porous polymer substrate is excessively thick), the separator may show excessively increased resistance.

According to an embodiment of the present disclosure, the polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous polymer substrate may have a puncture strength of 300 gf or more in terms of improvement of production yield. The puncture strength of a porous substrate refers to the highest puncture load (go measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 10 nm-100 nm and a thickness of 5 μm-12 μm may be used.

3) Inorganic Coating Layer

According to the present disclosure, the separator includes an inorganic coating layer formed on at least one surface of the porous polymer substrate. The inorganic coating layer includes a mixture containing a binder resin and inorganic particles. According to an embodiment of the present disclosure, the inorganic particles are closely packed in the inorganic coating layer and the inorganic coating layer may have a plurality of micropores derived from the interstitial volumes formed among the inorganic particles. The micropores are interconnected to provide a porous structure which allows gases or liquids to pass from one surface to the other surface. According to an embodiment of the present disclosure, the inorganic particles are totally or partially surface-coated with the binder resin and are bound to one another in a face-to-face or dot-to-dot manner by means of the binder resin. According to an embodiment of the present disclosure, the inorganic particles may be present in an amount of 50 wt % or more, preferably 60 wt % or more, 70 wt % or more, or 80 wt % or more, based on 100 wt % of the combined weight of the binder resin and the inorganic particles. Within the above-defined range, the inorganic particles may also be present in an amount of 95 wt % or less, or 90 wt % or less, based on 100 wt % of the combined weight of the binder resin and the inorganic particles.

The inorganic coating layer preferably has a thickness of 1 μm-5 μm on one surface of the porous substrate. Preferably, the thickness may be 3 μm or more. Within the above-defined range, it is possible to provide excellent adhesion to an electrode, thereby providing increased cell strength of the battery. Meanwhile, an inorganic coating layer thickness of 4 μm or less is advisable in terms of cycle characteristics and resistance characteristics of the battery.

Figures 4, 5:
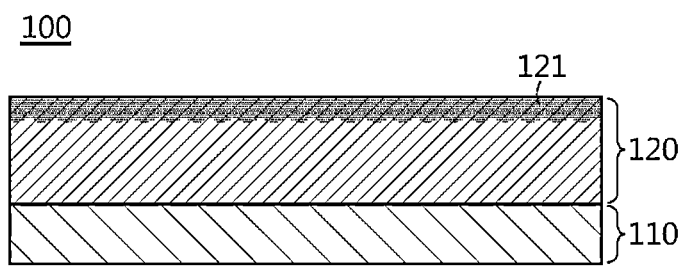
FIG. 4 is a schematic view illustrating the sectional structure of the separator according to an embodiment of the present disclosure.
FIG. 5 shows Table 1 in the form of a drawing.

Meanwhile, according to the present disclosure, the inorganic coating layer is provided with an electrode adhesive portion having a high content of binder resin at the top layer portion thereof by virtue of the characteristics of the method for manufacturing a separator described hereinafter. FIG. 4 is a schematic view illustrating the sectional structure of the separator 100 according to an embodiment of the present disclosure. Referring to FIG. 4, the separator according to the present disclosure includes an inorganic coating layer 120 on the surface of a porous polymer substrate 110, wherein the binder resin is distributed at a higher concentration at the top layer portion of the inorganic coating layer as compared to the other portions. For the convenience of description, the top layer portion in which the binder resin is distributed at a higher concentration will be referred to as 'electrode adhesive portion 121' hereinafter. According to an embodiment of the present disclosure, the electrode adhesive portion results from the migration of the binder resin toward the top layer portion through a process, such as humidified phase separation. Therefore, the electrode adhesive portion is not a structure separated physically from the inorganic coating layer but is bound integrally to the surface of the inorganic coating layer as a part of the inorganic coating layer. In addition, the thickness of the electrode adhesive portion may not be uniform. According to an embodiment of the present disclosure, the electrode adhesive portion may be defined as a portion containing the binder resin in an amount of 70 wt % or more, preferably 85 wt % or more, from the topmost portion in the thickness direction of the inorganic coating layer.

B. Materials for Inorganic Coating Layer

B1. Binder Resin

According to an embodiment of the present disclosure, the inorganic coating layer includes a PVdF-based polymer as a first binder resin and an acrylic polymer as a second binder resin, wherein the acrylic polymer has an acid value of 1 or less.

According to an embodiment of the present disclosure, the PVdF-based polymer may include at least one of vinylidene fluoride homopolymer (i.e. polyvinylidene fluoride), copolymer of vinylidene fluoride with a copolymerizable monomer and a mixture thereof. According to an embodiment of the present disclosure, a fluorinated monomer and/or a chlorinated monomer may be used as a copolymerizable monomer. Non-limiting examples of the fluorinated monomer include at least one of vinyl fluoride; trifluoroethylene (TrFE); chlorofluoromethylene (CTFE); 1,2-difluoroethylene; tetrafluoro ethylene (TFE); hexafluoropropylene (HFP); perfluoro(alkylvinyl)ether, such as perfluoro(methylvinyl)ether (PMVE), perfluoro(ethylvinyl)ether (PEVE) and perfluoro(propylvinyl)ether (PPVE); perfluoro(1,3-dioxole); and perfluoro(2,2-dimethyl-1,3-dioxole) (PDD), or the like. According to an embodiment of the present disclosure, the PVdF-based polymer resin may include at least one selected from PVdF, PVdF-HFP, PVdF-CTFE, or the like. According to a particular embodiment of the present disclosure, the PVdF-based polymer may have a weight average molecular weight ($M_w$) of 300,000-1,000,000. For example, the PVdF-based polymer may have a weight average molecular weight ($M_w$) of 800,000 or less, within the above-defined range.

The acrylic polymer has a weight average molecular weight ($M_w$) of 100,000-200,000, an acid value of 1 or less, and a glass transition temperature ($T_g$) of 90° C.-130° C.

When the molecular weight is excessively higher than the above-defined range, there is a problem in that the inorganic particles cannot be dispersed well during the preparation of the slurry for forming an inorganic coating layer. On the other hand, when the molecular weight is excessively lower than the above-defined range, phase separation does not occur to cause a problem of degradation of electrode adhesion due to a low content of acrylic polymer in the electrode adhesive portion. In addition, when $T_g$ is lower than the above-defined range, surface morphology may be deformed easily, even when phase separation occurs properly to accomplish a desired surface morphology. This may cause a decrease in adhesion. In addition, when the acid value is excessively high, affinity with the inorganic particles is increased and migration of the polymer is reduced by the inorganic particles to cause a decrease in phase separation efficiency. Therefore, the amount of the binder migrating toward the top layer portion may be reduced. According to the present disclosure, molecular weight may be weight average molecular weight ($M_w$) determined by gel permeation chromatography (GPC, PL GPC220, Agilent Technologies). According to the present disclosure, molecular weight may be expressed in the unit of g/mol.

Meanwhile, according to the present disclosure, the acrylic polymer may be used in an amount of 10 wt %-80 wt % based on 100 wt % of the binder resin. In terms of formation of the electrode adhesive portion through phase separation, the acrylic polymer may be used preferably in an amount of 50 wt % or less. When the amount of the acrylic polymer is increased and that of the PVdF-based polymer resin is reduced, the absolute content of the PVdF-based polymer resin that can be distributed at the top layer portion is reduced and the migration of the PVdF-based polymer resin may be limited by the acrylic polymer. FIG. 3a to FIG. 3d show the results of humidified phase separation as a function of the ratio between the PVdF-based polymer and the acrylic polymer, PMMA, in Reference Examples 1a-1d. Referring to FIGS. 3a-3d, it can be seen that as the proportion of PMMA in the binder resin is increased, humidified phase separation is degraded.

As used herein, 'acid value' refers to the amount (mg) of KOH required to neutralize free fatty acids contained in 1 g of resin and is expressed in the unit of KOH-mg/g. The acid value may be calculated according to the following Formula:

Acid value=$A \times N \times f \times KOH$ consumption (mL)/$S$   [Formula]

wherein A represents the molecular weight of KOH, N represents the concentration of the KOH standard solution, f represents the titer of 0.1 N KOH solution, and S represents the amount (g) of a resin to be used.

According to the present disclosure, the acrylic polymer may include a (meth)acrylic polymer, or the like. The (meth)acrylic polymer includes (meth)acrylate as a monomer, and the monomer may include at least one monomer, such as butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate or tetradecyl (meth)acrylate.

According to a preferred embodiment of the present disclosure, the acrylic polymer includes poly(methyl methacrylate) (PMMA). In addition, the PMMA has a weight average molecular weight ($M_w$) of 100,000-200,000, an acid value of 1 or less, and a glass transition temperature ($T_g$) of 90° C.-130° C.

According to an embodiment of the present disclosure, the inorganic coating layer may further include additives, such as a dispersing agent and/or thickening agent, in an amount of 1-3 wt % based on 100 wt % of the inorganic coating layer. According to an embodiment of the present disclosure, the additive may be at least one selected suitably from polyvinyl pyrrolidone (PVP), polyvinyl alcohol (PVA), hydroxyethyl cellulose (HEC), hydroxypropyl cellulose (HPC), ethylhydroxyethyl cellulose (EHEC), methyl cellulose (MC), carboxymethyl cellulose (CMC), hydroxyalkyl methyl cellulose, and cyanoethylene polyvinyl alcohol.

B2. Inorganic Particles

According to a particular embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be high-dielectric constant inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT, wherein 0<x<1), $Pb_{1-x}La_xZr_{1-y}Ti_yO_3$ (PLZT, wherein 0<x<1, 0<y<1), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or a mixture thereof.

In addition, as inorganic particles, it is possible to use inorganic particles having lithium ion transportability, i.e. inorganic particles which contain lithium elements and do not store lithium but transport lithium ions. Non-limiting examples of the inorganic particles having lithium ion transportability include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$-based glass (0<x<4, 0<y<13), such as $14Li_2O$—$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, and $P_2S_5$-based glass ($Li_xP_yS_z$, 0<x<3, 0<y<3, 0<z<7), such as LiI—$Li_2S$—$P_2S_5$, or a mixture of two or more of them.

In addition, there is no particular limitation in the average particle diameter of the inorganic particles. However, the inorganic particles preferably have an average particle diameter of 0.1-1.5 μm with a view to formation of a coating layer with a uniform thickness and suitable porosity. When the average particle diameter is smaller than 0.1 μm, dispersibility may be degraded. When the average particle diameter is larger than 1.5 μm, the resultant coating layer may have an increased thickness.

2. Method for Forming Inorganic Coating Layer

First, the binder resin is dissolved in a solvent to prepare a polymer binder solution. Next, the polymer binder solution is introduced to and mixed with a mixture containing the inorganic particles and solvent to prepare slurry for forming an inorganic coating layer. If necessary, supplementary agents, such as a dispersing agent, may be further introduced to the mixture and/or slurry. Then, the slurry is applied onto a porous polymer substrate and is allowed to stand under a humidified condition for a predetermined time to solidify (dry) the binder resin. While solidification is carried out under a humidified condition, phase separation of the binder resin occurs in the slurry. According to an embodiment of the present disclosure, the humidified condition may include a relative humidity of about 40-80%. During the phase separation, the solvent migrates toward the surface portion of the inorganic coating layer and the binder resin migrates toward the surface portion of the inorganic coating layer along with the migration of the solvent, thereby forming an electrode adhesive portion having a high content of binder resin at the top layer portion. According to an embodiment of the present disclosure, the acrylic polymer migrates toward the top layer portion together with the PVdF-based polymer in the electrode adhesive portion. Therefore, the ratio between the PVdF-based polymer and the acrylic polymer in the electrode adhesive portion is maintained at a level similar to the ratio of them introduced originally to prepare the slurry, and the ratio is maintained uniformly through the whole thickness of the inorganic coating layer. As a result, according to the present disclosure, an electrode adhesive portion having a high content of binder is formed effectively at the top layer portion by the PVdF-based polymer, and an adequate amount of the acrylic polymer is present in the electrode adhesive portion so that high adhesion may be realized between an electrode and the separator.

The solvent may be an ingredient capable of dissolving the binder resin. For example, the solvent may be selected suitably from acetone, methyl ethyl ketone, N-methyl pyrrolidone, and polar amide solvents such as dimethyl acetamide and dimethyl formamide.

The slurry may be applied through a conventional coating process, such as Mayer bar coating, die coating, reverse roll coating or gravure coating. When the inorganic coating layer is formed on both surfaces of the porous substrate, the coating solution may be applied to each surface and then humidified phase separation and drying may be carried out. However, it is preferred to apply the coating solution to both surfaces of the porous substrate at the same time, followed by humidified phase separation and drying, in terms of productivity.

3. Electrode Assembly Including Separator

Meanwhile, the present disclosure provides a secondary battery including the separator. The battery includes a negative electrode, a positive electrode and a separator interposed between the negative electrode and the positive electrode, wherein the separator is a low-resistance separator having the above-described characteristics.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3(0≤x≤1)$, $Li_xWO_2(0≤x≤1)$, $Sn_xMe_{1-x}Me'_yO_z$ (Me: Mn, Fe, Pb, Ge; Me': Al, B, P, Si, elements of Group 1, 2 or 3 in the Periodic Table, halogen; $0<x≤1$; $1≤y≤3$; $1≤z≤8$); lithium metal; lithium alloy; silicon-based alloy; tin-based alloy; metal oxides, such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Meanwhile, according to an embodiment of the present disclosure, the organic solvent includes an ester compound. Preferably, the ester compound may be used in an amount of 30 wt % or more, 50 wt % or more, 60 wt % or more, or 65 wt % or more, based on 100 wt % of the organic solvent.

According to an embodiment of the present disclosure, the ester compound includes at least one selected from the group consisting of isobutyl propionate, isoamyl propionate, isobutyl butyrate, isopropyl propionate, methyl propionate, ethyl propionate, propyl propionate, butyl propionate, methyl acetate, ethyl acetate, propyl acetate, butyl acetate, methyl butyrate, ethyl butyrate, propyl butyrate and butyl butyrate.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE

Manufacture of Separator

First, binder resins and a dispersing agent (cyanoethylene polyvinyl alcohol) were dissolved in 200 g of acetone to prepare a polymer solution. Next, inorganic particles (Japanese Light Metal Co., LS235, average particle diameter 0.5 μm) were introduced thereto and dispersed therein by using a ball mill to prepare slurry for an inorganic coating layer. A porous polymer substrate (B12PA1 available from Toray Co.) was prepared, and the slurry was coated on the surface of the substrate through dip coating and was allowed to stand under the condition of a relative humidity (RH) of about 50% for 2 minutes to induce humidified phase separation of the binder resins. The ingredients, such as binder resins, and content of each ingredient used for Examples and Comparative Examples are shown in the following Tables 1 and 2. As shown in Table 1, PMMA used for each Example has an acid value less than 1. Meanwhile, Table 1 is also shown in the form of a drawing in FIG. 5.

Result Analysis

Method for Determination of Resistance

The resistance of each of Examples and Comparative Examples was determined by the following method. An electrolyte was prepared by dissolving 1M $LiPF_6$ in a mixed solvent containing ethylene carbonate, propylene carbonate and propyl propionate at a volume ratio of 25:10:65. Each separator was cut into a circular shape having a diameter of 15 mm and impregnated with the electrolyte, and then the separator was interposed between two sheets of stainless steel electrodes to obtain a coin cell (Wellcos Corp.) having an electrode shape. The coin cell was determined for electric resistance by using an EIS analyzer (available from Solartron).

Method for Evaluating Peel Force

The separator sample obtained from each of Examples and Comparative Examples (e.g. Example 1) was cut into a size of 70 mm (length)×15 mm (width) to prepare specimens adhered to a glass plate to which a double-sided tape was applied. Each specimen was fixed to an adhesion strength tester (LLOYD Instrument, LF plus) and the upper separator specimen was peeled off at 25° C. and a rate of 25 mm/min with an angle of 180°, and the peel strength was measured.

Adhesion to Electrode ((−)-Adhesion)

Natural graphite, styrene butadiene rubber (SBR), carboxymethyl cellulose (CMC) and a conductive material (weight ratio 90:2.5:2.5:5) were introduced to water to obtain negative electrode slurry. The negative electrode slurry was applied to copper foil (thickness 20 μm) at a loading amount of 5 mg/cm$^2$, followed by drying. Next, the resultant structure was pressed under 8.5 MPa at 90° C. and cut into a size of 60 mm (length)×25 mm (width) to obtain a negative electrode. The separator obtained from each of Examples and Comparative Examples was cut into a size of 70 mm (length)×25 mm (width) and laminated with the negative electrode prepared as described above by using a press under 4 MPa at 70° C. to obtain a specimen. Then, the specimen was attached and fixed to a glass plate by using a double-sided tape in such a manner that the negative electrode might face the glass plate. The separator portion of the specimen was peeled off at 25° C. and a rate of 25 mm/min with an angle of 180°, and the strength was measured.

TABLE 1

| | Ingredients | | Ex. 1 | Ex. 2 | Ex. 3a | Ex.3b | Ex. 3c | Ex. 3d |
|---|---|---|---|---|---|---|---|---|
| Binder resin | PVdF-HFP | Molecular weight (Mw) | 400,000 | 400,000 | 400,000 | 400,000 | 400,000 | 400,000 |
| | | HFP content | 10 mol % | 10 mol % | 10 mol % | 10 mol % | 10 mol % | 10 mol % |
| | PMMA | Molecular weight (Mw) | 130,000 | 130,000 | 130,000 | 130,000 | 130,000 | 130,000 |
| | | Acid value | <1.0 | <1.0 | <1.0 | <1.0 | <1.0 | <1.0 |
| | | Tg (° C.) | 110 | 110 | 110 | 110 | 110 | 110 |
| PVdF-HFP:PMMA (Weight ratio) | | | 15:5 | 15:5 | 16:4 | 12:8 | 10:10 | 4:16 |
| Binder resin:Dispersing agent:Inorganic particles (Weight ratio) | | | 20:2:78 | 20:2:78 | 20:2:78 | 20:2:78 | 20:2:78 | 20:2:78 |

TABLE 2

| | Ingredients | | Comp. Ex. 1 | Comp. Ex. 2 | Comp. Ex. 3 | Comp. Ex. 4 |
|---|---|---|---|---|---|---|
| Binder resin | PVdF-HFP | Molecular weight (Mw) | 400,000 | 400,000 | 400,000 | 400,000 |

TABLE 2-continued

| Ingredients | | Comp. Ex. 1 | Comp. Ex. 2 | Comp. Ex. 3 | Comp. Ex. 4 |
|---|---|---|---|---|---|
| | HFP content | 10 mol % | 10 mol % | 10 mol % | 10 mol % |
| PMMA | Molecular weight (Mw) | — | 50,000 | — | 110,000 |
| | Acid value | — | 2 | — | <1 |
| | Tg (° C.) | — | 116 | — | 52 |
| PVdF-HFP:PMMA (Weight ratio) | | 20:0 | 15:5 | 20:0 | 8:12 |
| Binder resin:Dispersing agent:Inorganic particles (Weight ratio) | | 20:2:78 | 20:2:78 | 20:2:78 | 20:2:78 |

The physical properties of the separator obtained from each of Examples and Comparative Examples are shown in the following Tables 3 and 4.

TABLE 3

| Measurement | Ex. 1 | Comp. Ex. 1 | Comp. Ex. 2 |
|---|---|---|---|
| Loading amount (g/m$^2$) | 11.0 | 11.6 | 10.6 |
| Thickness of separator (μm) | 17.2 | 18.7 | 16.5 |
| Resistance (ohm, EVPS) | 0.72 | 0.93 | 0.81 |
| Electrode-separator adhesion (gf/15 mm) | 87 | 65 | 41 |
| Peel strength (gf/15 mm) | 268 | 154 | 124 |

As shown in Table 3, Example 1 shows significantly higher electrode adhesion and peel strength as compared to Comparative Examples 1 and 2. In the case of the separator according to Example 1, it includes an acrylic polymer having an acid value less than 1, and the acrylic polymer remains and is distributed in the inorganic coating layer, and thus contributes to improvement of the binding force between the current collector and the inorganic coating layer and the binding force among the inorganic particles in the inorganic coating layer. In addition, the acrylic polymer having an acid value less than 1 participates in the migration of the first binder during the humidified phase separation and migrates toward the top layer portion together with the first binder, and thus contributes to improvement of the adhesion between the electrode and the separator. Further, in terms of electric resistance, the separator according to Example 1 shows a lower resistance value as compared to the separators according to Comparative Examples 1 and 2. In the case of Comparative Example 1, it includes no acrylic polymer and thus shows low electrode adhesion. In the case of Comparative Example 2, it uses PMMA having a high acid value, and thus shows a low content of PMMA at the electrode adhesive portion.

TABLE 4

| Measurement | Ex. 2 | Comp. Ex. 3 | Comp. Ex. 4 |
|---|---|---|---|
| Loading amount (g/m$^2$) | 14.0 | 13.7 | 13.2 |
| Thickness of separator (μm) | 18.5 | 18.2 | 18.2 |
| Resistance (ohm, EVPS) | 0.72 | 1.03 | 0.88 |
| Electrode-separator adhesion (gf/15 mm) | 107 | 64 | 42 |
| Peel strength (gf/15 mm) | 314 | 184 | 226 |

As shown in Table 4, Example 2 shows higher electrode adhesion and peel strength as compared to Comparative Examples 3 and 4. In addition, in the case of Example 2, it shows a lower resistance value as compared to Comparative Examples 3 and 4. In the case of Comparative Example 3, it includes no acrylic polymer and shows low electrode adhesion. In the case of Comparative Example 4, it uses PMMA having a low $T_g$, and thus undergoes deformation of morphology and shows low electrode adhesion.

The following Table 5 shows the results of evaluation of electrode adhesion as a function of PMMA ratio. As shown in Table 5, in the case of Example 3d having the highest PMMA ratio, it shows significantly lower electrode adhesion as compared to Examples 3a-3c. It is thought that this is because PMMA cannot participate in phase separation in the case of Example 3d, and thus cannot contribute to binding between the electrode and the separator.

TABLE 5

| Measurement | Ex. 3a | Ex. 3b | Ex. 3c | Ex. 3d |
|---|---|---|---|---|
| Loading amount (g/m$^2$) | 14.3 | 14.1 | 14.1 | 14.5 |
| Thickness of separator (μm) | 18.2 | 18.0 | 18.5 | 18.3 |
| Electrode adhesion (gf) | 37.2 | 39.9 | 52.5 | 3.3 |

Reference Examples

Meanwhile, Reference Examples 1a-1d were carried out in order to determine the effect of humidified phase separation depending on PMMA (acrylic polymer) ratio.

Binder resins were dissolved in 200 g of acetone to prepare a polymer solution. A porous polymer substrate (B12PA1 available from Toray Co.) was prepared and the polymer solution was coated on the surface of the porous polymer substrate through dip coating. The resultant structure was allowed to stand under the condition of a relative humidity (RH) of about 50% for 2 minutes to induce humidified phase separation of the binder resins. The ingredients, such as binder resins, and content of each ingredient used for Reference Examples are shown in the following Table 6.

TABLE 6

| Ingredients | | | Ref. Ex. 1a | Ref. Ex.1b | Ref. Ex. 1c | Ref. Ex. 1d |
|---|---|---|---|---|---|---|
| Binder resin | PVdF-HFP | Molecular weight (Mw) | 400,000 | 400,000 | 400,000 | 400,000 |
| | | HFP content | 10 mol % | 10 mol % | 10 mol % | 10 mol % |
| | PMMA | Molecular weight (Mw) | 130,000 | 130,000 | 130,000 | 130,000 |
| | | Acid value | <1.0 | <1.0 | <1.0 | <1.0 |
| | | Tg (° C.) | 110 | 110 | 110 | 110 |
| PVdF-HFP:PMMA (Weight ratio) | | | 8:2 | 6:4 | 5:5 | 2:8 |

FIG. 3a to FIG. 3d show the results obtained from Reference Examples 1a-1d, respectively. Referring to FIGS. 3a-3d, in the case of Reference Example 1d having the highest ratio of PMMA in the binder resin, humidified phase separation is degraded to provide surface morphology different from the surface morphology of each of Reference Examples 1a-1c. The surface morphology characteristics affect adhesion. Thus, it seems that the same results are obtained when inorganic particles are introduced.

What is claimed is:

1. A separator for an electrochemical device which comprises:
    a porous polymer substrate; and
    an inorganic coating layer formed on at least one surface of the porous polymer substrate,
    wherein the inorganic coating layer comprises inorganic particles and a binder resin,
    wherein the binder resin comprises a first binder resin and a second binder resin,
    wherein the first binder resin comprises a polyvinylidene fluoride (PVdF)-based polymer and the second binder resin comprises an acrylic polymer,
    wherein the acrylic polymer has an acid value of 1 or less and a glass transition temperature, $T_g$, of 90° C. to 130° C., and
    wherein a portion of the inorganic coating layer at a surface of the inorganic coating layer opposite to the porous polymer substrate forms an electrode adhesive portion, wherein the electrode adhesive portion has a content of binder resin that is higher than a content of binder resin in the remainder of the inorganic coating layer adjacent to the porous polymer substrate.

2. The separator for an electrochemical device according to claim 1, wherein the acrylic polymer has a weight average molecular weight ($M_w$) of 100,000 to 200,000.

3. The separator for an electrochemical device according to claim 1, wherein the acrylic polymer comprises a (meth)acrylate-containing (meth)acrylic polymer, and
    wherein monomer of the (meth)acrylate polymer comprises at least one selected from the group consisting of butyl (meth)acrylate, 2-ethylhexyl (meth)acrylate, ethyl (meth)acrylate, methyl (meth)acrylate, n-propyl (meth)acrylate, isopropyl (meth)acrylate, t-butyl (meth)acrylate, pentyl (meth)acrylate, n-octyl (meth)acrylate, isooctyl (meth)acrylate, isononyl (meth)acrylate, lauryl (meth)acrylate and tetradecyl (meth)acrylate.

4. The separator for an electrochemical device according to claim 1, wherein the acrylic polymer comprises poly(methyl methacrylate) (PMMA).

5. The separator for an electrochemical device according to claim 1, wherein the acrylic polymer comprises poly(methyl methacrylate) (PMMA), and
    wherein the PMMA has a molecular average molecular weight ($M_w$) of 100,000 to 200,000, an acid value of 1 or less, and a glass transition temperature, $T_g$, of 90° C. to 130° C.

6. The separator for an electrochemical device according to claim 1, wherein the acrylic polymer is present in an amount of 10 wt % to 80 wt % based on 100 wt % of the binder resin.

7. The separator for an electrochemical device according to claim 1, wherein the acrylic polymer is present in an amount of 10 wt % to 50 wt % based on 100 wt % of the binder resin.

8. The separator for an electrochemical device according to claim 1, wherein the PVdF-based polymer comprises at least one of vinylidene fluoride homopolymer, or copolymer of vinylidene fluoride with a copolymerizable monomer.

9. The separator for an electrochemical device according to claim 8, wherein the PVdF-based polymer has a molecular weight ($M_w$) of 300,000 to 1,000,000.

10. The separator for an electrochemical device according to claim 8, wherein the monomer copolymerizable with vinylidene fluoride is at least one selected from the group consisting of vinyl fluoride, trifluoroethylene (TrFE), chlorotrifluoroethylene (CTFE), 1,2-difluoroethylene, tetrafluoroethylene (TFE), hexafluoropropylene (HFP), perfluoro (alkylvinyl)ether, perfluoro(1,3-dioxole) and perfluoro(2,2-dimethyl-1,3-dioxole) (PDD).

11. The separator for an electrochemical device according to claim 1, wherein the electrode adhesive portion is disposed on the surface of the inorganic coating layer of the separator through a phase separation process under a humidified condition.

12. The separator for an electrochemical device according to claim 11, wherein the humidified condition comprises a relative humidity of 40% to 80%.

13. An electrode assembly for an electrochemical device comprising:
    a positive electrode;
    a negative electrode; and
    a separator interposed between the positive electrode and the negative electrode,
    wherein the separator is as defined in claim 1.

14. A method for manufacturing the separator for an electrochemical device as defined in claim 1, the method comprising:
    preparing the porous polymer substrate;
    applying a slurry for the inorganic coating layer onto at least one surface of the porous polymer substrate;
    subjecting the slurry to phase separation under a humidified condition to form an electrode adhesive portion of the inorganic coating layer on the surface of the inorganic coating layer of the separator, wherein a content of binder resin is higher in the electrode adhesive portion than a content of binder resin in the remainder of the inorganic coating layer adjacent to the porous polymer substrate.

15. The method for manufacturing the separator for an electrochemical device according to claim 14, wherein the humidified condition comprises a relative humidity of 40% to 80%.

16. The separator for an electrochemical device according to claim 1, wherein the electrode adhesive portion is integral and indivisible from the remainder of the inorganic coating layer adjacent to the porous polymer substrate, and wherein the electrode adhesive portion comprises the binder resin in an amount of 70 wt % or more from a topmost portion in a thickness direction of the inorganic coating layer.

* * * * *